US012637986B2

(12) United States Patent
Duranleau-Hendrickx et al.

(10) Patent No.: US 12,637,986 B2
(45) Date of Patent: May 26, 2026

(54) GAS TURBINE ACCELERATION LIMIT BIASING FOR PREMATURE ASYMMETRIC OPERATING REGIME EXITS

(71) Applicant: Pratt & Whitney Canada Corp., Longueuil (CA)

(72) Inventors: Louis Duranleau-Hendrickx, Montreal (CA); Andrea Henning, London (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/949,767

(22) Filed: Nov. 15, 2024

(65) Prior Publication Data

US 2026/0139634 A1 May 21, 2026

(51) Int. Cl.
F02C 9/42 (2006.01)
B64D 31/12 (2006.01)
F02C 9/28 (2006.01)

(52) U.S. Cl.
CPC .............. F02C 9/42 (2013.01); B64D 31/12 (2013.01); *F02C 9/28* (2013.01); *F05D 2270/04* (2013.01); *F05D 2270/13* (2013.01)

(58) Field of Classification Search
CPC ....... F02C 9/42; B64D 31/12; F05D 2270/04; F05D 2270/13
See application file for complete search history.

(56) References Cited

U.S. PATENT DOCUMENTS

| | | | |
|---|---|---|---|
| 10,435,167 | B2 | 10/2019 | Thiriet et al. |
| 11,867,129 | B2 | 1/2024 | Beauchesne-Martel et al. |
| 11,987,375 | B2 | 5/2024 | Manoukian et al. |
| 2020/0255159 | A1 | 8/2020 | Manoukian |
| 2020/0256265 | A1 | 8/2020 | Manoukian |
| 2021/0139158 | A1 | 5/2021 | Tang |
| 2023/0080365 | A1* | 3/2023 | Beauchesne-Martel ..................... F02C 9/42 701/3 |

OTHER PUBLICATIONS

European Search Report dated Apr. 9, 2026, in connection with European Patent Application No. 25216018.9, 8 pages.

* cited by examiner

*Primary Examiner* — Katheryn A Malatek

(57) ABSTRACT

A method includes sending a first control signal, wherein the first control signal causes a turbine engine of a plurality of turbine engines of an aircraft to initiate an entry into an asymmetric operating regime. The method further includes receiving, a control input for an exit from the asymmetric operating regime, determining, a progression state of the turbine engine into the asymmetric operating regime, and sending a second control signal for accelerating the turbine engine to a high-power operating regime, wherein the second control signal specifies a acceleration rate based on the progression state of the turbine engine into the asymmetric operating regime.

17 Claims, 3 Drawing Sheets

200

300

305 — SEND FIRST CONTROL SIGNAL, CAUSING AT LEAST ONE TURBINE ENGINE TO INITIATE ENTRY INTO AOR

310 — RECEIVE CONTROL INPUT FOR AN EXIT FROM AOR

315 — DETERMINE A PROGRESSION STATE OF THE TURBINE ENGINE INTO THE AOR

320 — SEND SECOND CONTROL SIGNAL FOR RE-ACCELERATING TURBINE ENGINE, WHEREIN SECOND CONTROL SIGNAL SPECIFIES RE-ACCELERATION RATE BASED ON PROGRESSION STATE INTO AOR

GAS TURBINE ACCELERATION LIMIT BIASING FOR PREMATURE ASYMMETRIC OPERATING REGIME EXITS

TECHNICAL FIELD

This disclosure is generally directed to aircraft powertrain control. More specifically, this disclosure is directed to gas turbine acceleration limit biasing for premature asymmetric operating regime exits.

BACKGROUND

High-level design trends within aviation include a move towards increased optimizing the fuel efficiency of aircraft during standard cruise conditions. For multi-engine aircraft, in particular, aircraft with multiple engines (for example, some helicopters and propeller-driven fixed wing aircraft), implementing an "idle cruise regime" or "asymmetric operating regime" wherein one or more of the craft's engines operates in a high-power state, and one or more of the craft's engines operates in a lower-power standby mode. For certain stable, highly predictable, operating conditions (for example, cruising at high altitude), asymmetric operation can provide significant fuel savings over running multiple engines at the same total cruise rating. However, the challenges of implementing an asymmetric operating regime include, without limitation, restoring the one or more engines operating in a standby mode to full power quickly, while at the same time, ensuring that the ramp-up in power is appropriate to the altitude and other conditions and does not cause the engine to stall, flame out, or otherwise stop running. Ensuring rapid restoration of power in idling engines to handle changes in operating mode (for example, climbing to a higher altitude) remains a source of technical challenges and opportunities for improvement in the art.

SUMMARY

This disclosure is directed to gas turbine acceleration limit biasing for premature asymmetric operating regime exits.

In some embodiments, a method includes sending a first control signal, wherein the first control signal causes a turbine engine of a plurality of turbine engines of an aircraft to initiate an entry into an asymmetric operating regime. The method includes receiving, a control input for an exit from the asymmetric operating regime, determining, a progression state of the turbine engine into the asymmetric operating regime, and sending a second control signal for accelerating the turbine engine to a high-power operating regime, wherein the second control signal specifies an acceleration rate based on the progression state of the turbine engine into the asymmetric operating regime.

In some embodiments, an apparatus includes an input/output interface and a processor. The processor can be configured to send a first control signal, wherein the first control signal causes a turbine engine of a plurality of turbine engines of an aircraft to initiate an entry into an asymmetric operating regime. The processor can be configured to receive a control input for an exit from the asymmetric operating regime. The processor can be configured to determine, a progression state of the turbine engine into the asymmetric operating regime. The processor can be configured to send a second control signal for accelerating the turbine engine to a high-power operating regime, wherein the second control signal specifies a acceleration rate based on the progression state of the turbine engine into the asymmetric operating regime.

In some embodiments, a non-transitory computer-readable medium includes instructions, which when executed by a processor, cause an apparatus to send a first control signal, wherein the first control signal causes a turbine engine of a plurality of turbine engines of an aircraft to initiate an entry into an asymmetric operating regime, receive, a control input for an exit from the asymmetric operating regime, determine, a progression state of the turbine engine into the asymmetric operating regime, and send a second control signal for accelerating the turbine engine to a high-power operating regime, wherein the second control signal specifies an acceleration rate based on the progression state of the turbine engine into the asymmetric operating regime.

Any single one or any combination of the following features may be used with the example embodiments above. The progression state of the turbine engine into the asymmetric operating regime can be determined based on a current value of a measured speed of the turbine engine. The progression state of the turbine engine into the asymmetric operating regime can be determined based on at least one of: a time elapsed since sending the first control signal, a current value of a measured power of the turbine engine, a measured pressure within the turbine engine, or a measured temperature within the turbine engine. Responsive to determining that the progression state of the turbine engine into the asymmetric operating regime is a complete entry into the asymmetric operating regime, a first acceleration rate as the acceleration rate can be specified and responsive to determining that the progression state of the turbine engine into the asymmetric operating regime is incomplete, a second acceleration rate can be specified as the acceleration rate. The first acceleration rate can be greater than the second acceleration rate. The nominal acceleration rate can be determined based on at least one of: engine gas generator speed, a current airspeed or a current altitude. A nominal acceleration rate can be obtained, responsive to determining that the progression state of the turbine engine into the asymmetric operating regime is the complete entry into the asymmetric operating regime, the nominal acceleration rate can be specified as the first acceleration rate, and responsive to determining that the progression state of the turbine engine into the asymmetric operating regime is incomplete, the nominal acceleration rate downwards can be biased downwards to obtain the second acceleration rate. A value expressing the progression state of the turbine engine into the asymmetric operating regime can be determined. Responsive to determining that the progression state of the turbine engine into the asymmetric operating regime is incomplete, a bias value for the value expressing the progression state of the turbine engine into the asymmetric operating regime can be determined and the determined bias value can be applied to the nominal acceleration rate to obtain the second acceleration rate. It should be noted that, in some embodiments, the nominal acceleration rate, second acceleration rate and bias value can each be dependent on multiple parameters, including engine gas generator speed and altitude in combination.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
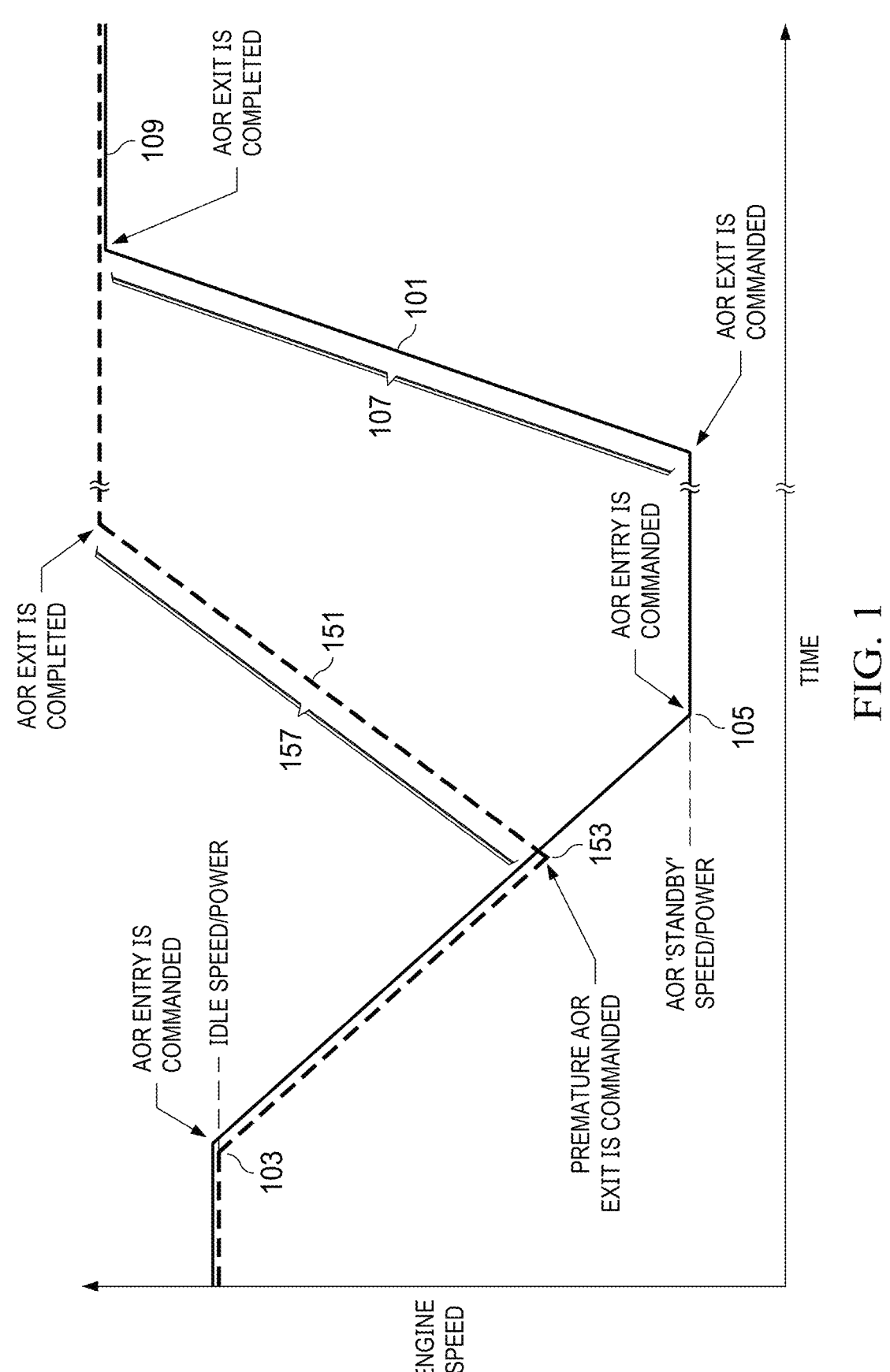
FIG. 1 illustrates aspects of a premature exit from an asymmetric operating regime according to this disclosure.
Figure 2:
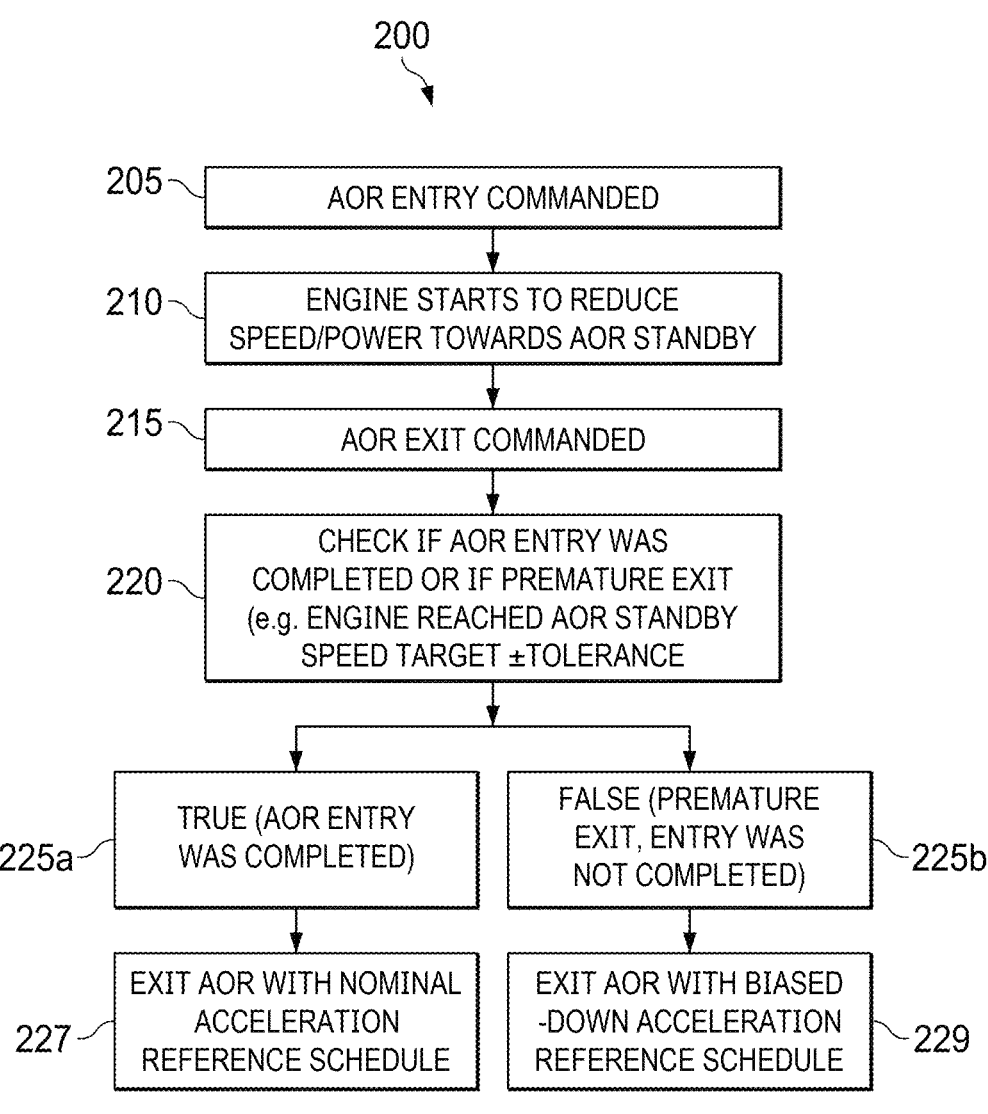
FIG. 2 illustrates an example method for biasing a acceleration rate according to this disclosure.
Figure 3:
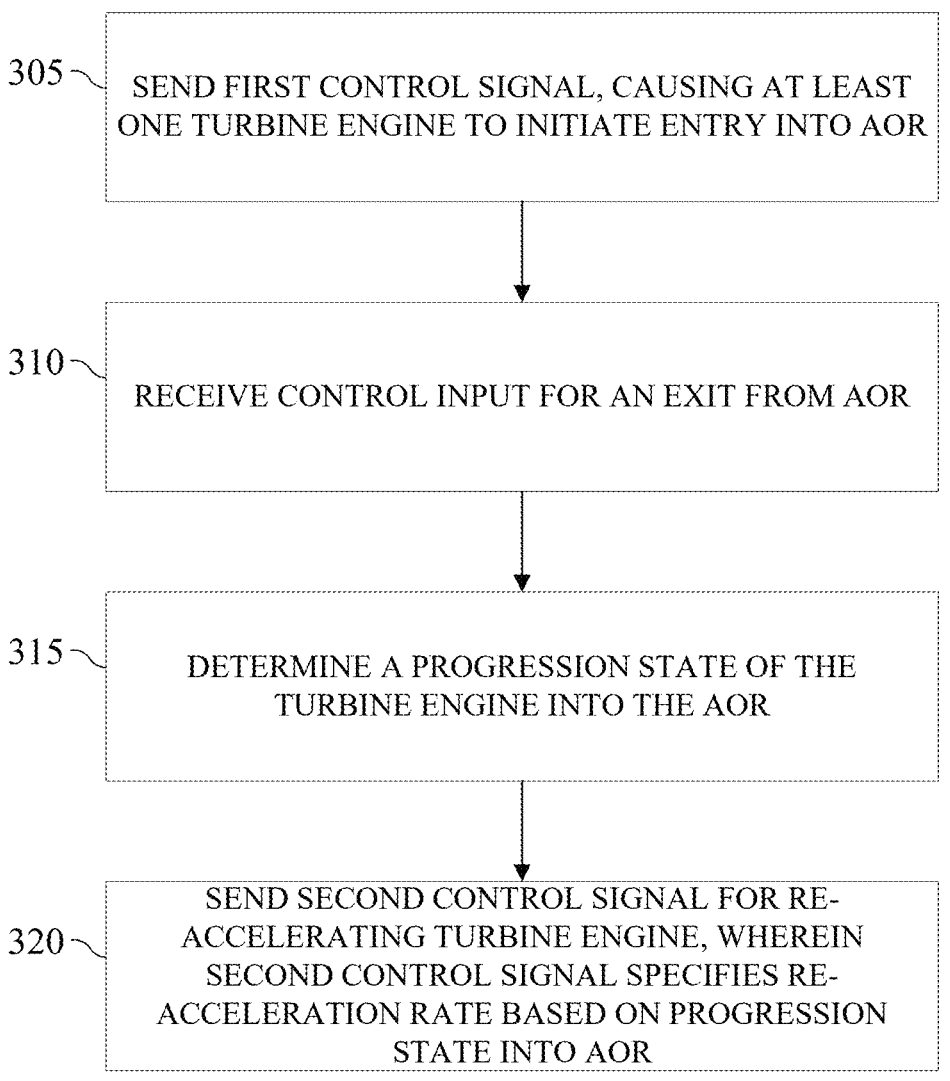
FIG. 3 illustrates another example method for biasing a premature exit from an asymmetric operating regime according to various embodiments of this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, high-level trends in the aviation industry include, without limitation, an intensified focus on optimizing the fuel efficiency of aircraft. For certain multi-engine aircraft (for example, helicopters with multiple turboshaft engines) significant fuel efficiency gains can be realized by implementing what is known as an asymmetric operating regime (AOR) (sometimes also referred to as an idle cruise regime (ICR)) during predictable or stable operating conditions, such as cruising. When in an AOR, at least one of the aircraft's engines is operating in a high-power mode, while one or more engines are in an idle, or low-power mode. Exiting the AOR, for example, to initiate a flight maneuver can require "powering up" the one or more engines from the idle mode to provide the power necessary for the flight maneuver. Powering up a previously idle, or decelerated engine requires accelerating the engine at a rate which balances at least the following objectives: a.) getting the engine back up to speed as quickly as possible; and b.) not exceeding the engine's instant acceleration stability limit for the current operating conditions.

An engine's instant acceleration stability limit is a function of multiple variables, including altitude and engine gas generator corrected speed. While previously neither considered nor understood, an engine's deceleration state (i.e., whether it has fully reached an idle, or low-power mode) can be a significant determinant of the acceleration limit for returning to a high-power state. It has been found that, where a turbine engine has fully or mostly decelerated to its idle or low-power state, the instant acceleration stability limit is higher for the same engine gas generator corrected speed than if the engine had only partially decelerated.

Embodiments according to the present disclosure provide methods, apparatus, and computer-readable program products for controlling a turbine engine (including without limitation, turboshaft, turbofan, turboprop and turbojet engines) to perform an optimized exit from an asymmetrical operating regime.

FIG. 1 provides plots of variable of interest versus time to illustrate examples of normal and premature exits from an asymmetrical operating regime according to this disclosure.

Referring to the illustrative of example of FIG. 1, a coordinate system with time on the x, or horizontal axis, and the engine speed of a turbine engine is shown on the y, or vertical axis is provided in the figure. While in this example, engine speed is shown on the y axis, other metrics of the operating state of the turbine engine, such as engine power, internal pressure or temperature could be substituted. As noted elsewhere in this disclosure, while in many embodiments, the turbine engine is a turboshaft engine, the present disclosure is not so limited, and implementations of asymmetric operating regimes are also possible in turboprop, turbofan or turbojet engines.

Two plots of engine speed (for example, engine gas generator corrected speed) versus time are shown in the example of FIG. 1. A first plot 101 shows the engine speed as a function of time for a complete entry of the turbine engine from an idle power level point 103 to a "standby" power level point 105 maintained during the asymmetric operating regime, followed by a normal exit from the asymmetric operating regime to a higher-power level 109 required for a flight maneuver.

A second plot 151, shows engine speed as a function of time for a premature exit from an asymmetric operating mode. As used in this disclosure, the expression "premature exit from asymmetric operating mode," encompasses acceleration of the engine before one or more metrics of engine operation (for example, speed, power, internal pressure, etc.) reaches a value associated with a standby level (for example, standby power level point 105) maintained during the asynchronous operating regime. As shown in the figure, second plot 151 does not "flatten out" at power level 105, but rather, abruptly increases at time 153, and trends upwards along second acceleration curve 157. Attention is directed to the fact that the slope of second acceleration curve 157, which corresponds to a acceleration rate for the turbine engine from a premature exit from the asymmetric operating regime is less steep than the slope of first acceleration curve 107 following full entry into the asymmetric operating regime.

Due to thermal effects and the fact that turbine components cool down and equilibrate after settling into an asymmetric operating regime, it is possible to accelerate a turbine engine at a higher reacceleration rate following a complete powering down to a power level associated with an asymmetric operating regime more rapidly than during a premature exit. Expressed differently, the surge margin for reaccelerating a turbine engine can be reduced in cases of premature exit from an asymmetric operating regime. To ensure proper operation across all operating regimes, embodiments according to the present disclosure comprise methods, apparatus and computer-readable program products which can tune acceleration rates for turbine engines for exit from an asymmetric operating regime.

FIG. 2 illustrates operations of a method 200 for biasing a acceleration rate of a turbine engine to account for premature exits from an asymmetric operating regime. The operations described with reference to FIG. 2 can, in some embodiments, be performed by any apparatus suitable configured to control the acceleration and deceleration of a turbine engine, including without limitation, a Full Authority Digital Engine Control ("FADEC") system, or an electronic engine controller ("EEC").

At block 205, the apparatus sends a first control signal, wherein the first control signal causes a turbine engine to initiate an entry into an asymmetric operating regime, wherein at least one turbine engine will be operating at a "standby level" and at least one other turbine engine will be operating in a high-power operating regime. In some embodiments, the standby level comprises keeping the turbine in an "on" state, albeit at a significantly reduced operating rate. In some embodiments, the standby level can be a fully "off" state, wherein, during the AOR exit, the turbine engine is both restarted and spun up to the rotational speed of a higher operating regime.

At block 210, in response to receipt and implementation of the first control signal, the turbine engine decreases a current value of one or more metrics (for example, engine speed or engine power) indicative of its operating regime. Referring back to the illustrative example of FIG. 1, the engine speed or other representative metric begins on the descent path between points 103 and 105 in the figure.

At block 215, the controller receives a control input commanding an exit from the asymmetric operating regime. In some cases, the control input received at block 215 can be user generated (for example, the pilot provides a control input, such as pulling back on a control stick to climb) associated with a greater need for power than is provided in the fuel-efficient asymmetric operating regime. In some cases, the control input received at block 215 is automatically generated, for example, in response to determination of an error condition (for example, a potential issue with the engine currently operating in a high-power operating regime, or in response to a change in ground speed or other operating metric indicating a headwind, turbulence or other condition counseling in favor of having greater engine power immediately available.

At block 220, a determination is performed as to whether, at the time the AOR exit was commanded at block 215, the engine had completed its entry into the AOR regime, or whether, like second plot 151 in FIG. 1, the turbine engine's progression to the AOR regime incomplete, and the requested exit is premature. Depending on embodiments, the determination of whether the commanded AOR exit is premature or not can be performed in a variety of ways. In some embodiments, the determination can be made based on a comparison of a current operating metric of the turbine engine, such as engine speed, temperature, internal pressure, or measured power relative to a target value for the AOR. If the measured value of the current operating metric falls within an error margin of the target value, then a determination that the requested AOR exit is not premature is made. Similarly, if the current operating metric falls outside the error margin of the target value, then a determination that the requested AOR exit is premature is made. Additionally, or alternatively, the determination of whether the turbine engine has successfully reached the AOR can be determined based on a time measurement, wherein the time elapsed between block 205 and block 220 is measured to assess whether the turbine engine has had sufficient opportunity to slow down and enter the AOR.

Block 220 produces one of two outputs, a determination that AOR entry complete=TRUE (Block 225a) or AOR entry complete=FALSE (Block 225b). In response to the determination that the AOR entry is complete, operation proceeds to block 227, wherein the engine controller issues a second control signal causing the turbine engine to exit the AOR according to a nominal acceleration rate specified by a reference schedule. In some embodiments, the controller or another onboard memory maintains a look-up table (LUT) of specified acceleration rates for one or more current operating conditions (for example, altitude or airspeed), wherein the LUT provides values of nominal acceleration rates (acceleration rates which fall within a specified surge margin) for non-premature exits from the AOR regime under the current operating conditions.

In response to the determination that the AOR entry is incomplete (block 225b), and the requested at block 215 is premature, operation proceeds to block 229, wherein the nominal acceleration rate is biased downwards to account for the thermal effects and transition between equilibrium states. According to some embodiments, a bias value is determined based on one or more current operating conditions (for example, airspeed, altitude, engine temperature, gas generator speed) of the turbine engine. Additionally, or alternatively, the bias value is determined dynamically, and as a function of how far the turbine engine has progressed from its original operating state towards its "standby" state specified under the AOR, with a bias value effecting a greater reduction in the acceleration rate in cases where the progression from the initial operating regime to the "standby" state is less complete.

Although FIG. 2 illustrates one example of a method for biasing a premature exit from an asymmetric operating regime, various changes may be made to FIG. 2. For example, while shown as a series of steps, various steps in FIG. 2 could overlap, occur in parallel, occur in a different order, or occur any number of times (including zero times).

FIG. 3 illustrates operations of an example method 300 for biasing a premature exit from an asymmetric operating regime according to various embodiments of this disclosure. As with the operations of method 200 described in FIG. 2, the operations of method 300 can be performed using any suitably configured turbine engine controller, including, without limitation, a FADEC or EEC.

Referring to the illustrative example of FIG. 3, at operation 305, a controller sends a first control signal to one or more turbine engines (but not all) of a multi-engine aircraft to initiate an entry into an asymmetric operating regime (AOR). As discussed elsewhere herein, operation 305 initiates a process of reducing the value of one or more representative metrics of turbine engine operating state from an initial level to a "standby" level associated with the AOR.

At operation 310, the controller receives a control input for an exit from the AOR. The control input can be received automatically, such as in response to a change in operating condition or error state (for example, another turbine engine overheating or malfunctioning). Additionally, or alternatively, the control input can be received from a flight maneuver performed by the pilot, such as a change of the throttle control or climb maneuver. Regardless, the control input received at operation 310 is associated with a switch towards an operating regime wherein the availability of power is a higher operational priority than fuel economy.

At operation 315, the controller determines a progression state of the turbine engine into the asymmetric operating regime. Depending on embodiments, the determination performed at operation 315 may be a simple binary determination, such as described with reference to blocks 225a-b in FIG. 2. Additionally, or alternatively, in some embodiments, the determination performed at operation 315 may quantize the degree to which the turbine engine has progressed into the asymmetric operating regime according to values of one or more variables. Examples of such variables include, without limitation, engine speed, engine temperature, engine pressure, engine power, and elapsed time since issuance of the first control signal.

At operation 320, the controller sends a second control signal for accelerating the turbine engine to a high-power operating regime, wherein the second control signal specifies a acceleration rate based the progression state of the turbine engine into the asymmetric regime. According to some embodiments, the specified acceleration rate may be one of a nominal acceleration rate, or a nominal acceleration rate which has been biased downward to account for the reduced surge margin associated with acceleration out of a premature AOR exit.

Although FIG. 3 illustrates one example of a method for biasing a premature exit from an asymmetric operating regime, various changes may be made to FIG. 3. For example, while shown as a series of steps, various steps in FIG. 3 could overlap, occur in parallel, occur in a different order, or occur any number of times (including zero times).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
sending a first control signal, wherein the first control signal causes a turbine engine of a plurality of turbine engines of an aircraft to initiate an entry into an asymmetric operating regime;
receiving, a control input for an exit from the asymmetric operating regime;
determining, a progression state of the turbine engine into the asymmetric operating regime;
sending a second control signal for accelerating the turbine engine to a high-power operating regime, wherein the second control signal specifies an acceleration rate based on the progression state of the turbine engine into the asymmetric operating regime;
responsive to determining that the progression state of the turbine engine into the asymmetric operating regime is a complete entry into the asymmetric operating regime, specifying a first acceleration rate as the acceleration rate; and
responsive to determining that the progression state of the turbine engine into the asymmetric operating regime is incomplete, specifying a second acceleration rate as the acceleration rate,
wherein the first acceleration rate is greater than the second acceleration rate.

2. The method of claim 1, wherein the progression state of the turbine engine into the asymmetric operating regime is determined based on a current value of a measured speed of the turbine engine.

3. The method of claim 1, wherein the progression state of the turbine engine into the asymmetric operating regime is determined based on at least one of: a time elapsed since sending the first control signal, a current value of a measured power of the turbine engine, a measured pressure within the turbine engine, or a measured temperature within the turbine engine.

4. The method of claim 1, further comprising:
obtaining a nominal acceleration rate;
responsive to determining that the progression state of the turbine engine into the asymmetric operating regime is the complete entry into the asymmetric operating regime, specifying the nominal acceleration rate as the first acceleration rate; and
responsive to determining that the progression state of the turbine engine into the asymmetric operating regime is incomplete, biasing the nominal acceleration rate downwards to obtain the second acceleration rate.

5. The method of claim 4, wherein the nominal acceleration rate is determined based on at least one of a current airspeed or a current altitude.

6. The method of claim 4, further comprising:
determining a value expressing the progression state of the turbine engine into the asymmetric operating regime;
responsive to determining that the progression state of the turbine engine into the asymmetric operating regime is incomplete, determining a bias value for the value expressing the progression state of the turbine engine into the asymmetric operating regime; and
applying the determined bias value to the nominal acceleration rate to obtain the second acceleration rate.

9
10

7. An apparatus, comprising:

an input/output interface;

a processor, wherein the processor is configured to:

send a first control signal, wherein the first control signal causes a turbine engine of a plurality of turbine engines of an aircraft to initiate an entry into an asymmetric operating regime;

receive, a control input for an exit from the asymmetric operating regime;

determine, a progression state of the turbine engine into the asymmetric operating regime;

send a second control signal for accelerating the turbine engine to a high-power operating regime, wherein the second control signal specifies an acceleration rate based on the progression state of the turbine engine into the asymmetric operating regime;

responsive to determining that the progression state of the turbine engine into the asymmetric operating regime is a complete entry into the asymmetric operating regime, specify a first acceleration rate as the acceleration rate; and responsive to determining that the progression state of the turbine engine into the asymmetric operating regime is incomplete, specify a second acceleration rate as the acceleration rate, wherein the first acceleration rate is greater than the second acceleration rate.

8. The apparatus of claim 7, wherein the progression state of the turbine engine into the asymmetric operating regime is determined based on a current value of a measured speed of the turbine engine.

9. The apparatus of claim 7, wherein the progression state of the turbine engine into the asymmetric operating regime is determined based on at least one of: a time elapsed since sending the first control signal, a current value of a measured power of the turbine engine, a measured pressure within the turbine engine, or a measured temperature within the turbine engine.

10. The apparatus of claim 7, wherein the processor is further configured to:

obtain a nominal acceleration rate;

responsive to determining that the progression state of the turbine engine into the asymmetric operating regime is the complete entry into the asymmetric operating regime, specify the nominal acceleration rate as the first acceleration rate; and responsive to determining that the progression state of the turbine engine into the asymmetric operating regime is incomplete, bias the nominal acceleration rate downwards to obtain the second acceleration rate.

11. The apparatus of claim 10, wherein the nominal acceleration rate is determined based on at least one of a current airspeed or a current altitude.

12. The apparatus of claim 10, wherein the processor is further configured to:

determine a value expressing the progression state of the turbine engine into the asymmetric operating regime;

responsive to determining that the progression state of the turbine engine into the asymmetric operating regime is incomplete, determine a bias value for the value expressing the progression state of the turbine engine into the asymmetric operating regime; and apply the determined bias value to the nominal acceleration rate to obtain the second acceleration rate.

13. A non-transitory computer-readable medium containing instructions, which when executed by a processor, cause an apparatus to:

send a first control signal, wherein the first control signal causes a turbine engine of a plurality of turbine engines of an aircraft to initiate an entry into an asymmetric operating regime;

receive, a control input for an exit from the asymmetric operating regime;

determine, a progression state of the turbine engine into the asymmetric operating regime;

send a second control signal for accelerating the turbine engine to a high-power operating regime, wherein the second control signal specifies an acceleration rate based on the progression state of the turbine engine into the asymmetric operating regime;

responsive to determining that the progression state of the turbine engine into the asymmetric operating regime is a complete entry into the asymmetric operating regime, specify a first acceleration rate as the acceleration rate; and responsive to determining that the progression state of the turbine engine into the asymmetric operating regime is incomplete, specify a second acceleration rate as the acceleration rate, wherein the first acceleration rate is greater than the second acceleration rate.

14. The non-transitory computer-readable medium of claim 13, wherein the progression state of the turbine engine into the asymmetric operating regime is determined based on a current value of a measured speed of the turbine engine.

15. The non-transitory computer-readable medium of claim 13, wherein the progression state of the turbine engine into the asymmetric operating regime is determined based on at least one of: a time elapsed since sending the first control signal, a current value of a measured power of the turbine engine, a measured pressure within the turbine engine, or a measured temperature within the turbine engine.

16. The non-transitory computer-readable medium of claim 13, further comprising instructions, which, when executed by the processor, cause the apparatus to:

obtain a nominal acceleration rate;

responsive to determining that the progression state of the turbine engine into the asymmetric operating regime is the complete entry into the asymmetric operating regime, specify the nominal acceleration rate as the first acceleration rate; and responsive to determining that the progression state of the turbine engine into the asymmetric operating regime is incomplete, bias the nominal acceleration rate downwards to obtain the second acceleration rate.

17. The non-transitory computer-readable medium of claim 16, wherein the nominal acceleration rate is determined based on at least one of a current airspeed or a current altitude.

* * * * *